(12) United States Patent
Marable, Jr. et al.

(10) Patent No.: US 8,570,538 B1
(45) Date of Patent: Oct. 29, 2013

(54) BUILDING SURFACE AREA MEASUREMENT SYSTEM

(71) Applicants: James A. Marable, Jr., Modesto, CA (US); Sharon L. Berry-Harper, Gardens, CA (US); Arthur Lee Berry, Gardena, CA (US)

(72) Inventors: James A. Marable, Jr., Modesto, CA (US); Sharon L. Berry-Harper, Gardens, CA (US); Arthur Lee Berry, Gardena, CA (US)

( * ) Notice: Subject to any disclaimer, the term of this patent is extended or adjusted under 35 U.S.C. 154(b) by 0 days.

(21) Appl. No.: 13/667,027

(22) Filed: Nov. 2, 2012

(51) Int. Cl.
*G01B 11/28* (2006.01)

(52) U.S. Cl.
USPC ............................................. 356/628

(58) Field of Classification Search
USPC .................................. 356/628, 625
See application file for complete search history.

(56) References Cited

U.S. PATENT DOCUMENTS

| | | | |
|---|---|---|---|
| 5,539,990 A * | 7/1996 | Le | 33/283 |
| 5,864,956 A * | 2/1999 | Dong | 33/227 |
| 5,894,675 A | 4/1999 | Cericola | |
| D418,763 S | 1/2000 | Krantz | |
| 6,230,416 B1 | 5/2001 | Trigilio | |
| 6,430,823 B1 * | 8/2002 | Seki | 33/281 |
| 6,449,855 B1 | 9/2002 | Louis | |
| 7,310,887 B2 * | 12/2007 | Nash et al. | 33/286 |
| 7,430,810 B2 | 10/2008 | Sergyeyenko | |
| 7,797,844 B2 * | 9/2010 | Hobden et al. | 33/286 |
| 7,992,310 B2 * | 8/2011 | Litvin et al. | 33/286 |
| 2006/0017427 A1 * | 1/2006 | Nash et al. | 324/67 |

* cited by examiner

Primary Examiner — Roy M Punnoose
(74) Attorney, Agent, or Firm — Michael S. Neustel (57) ABSTRACT

A building surface area measurement system for efficiently measuring the surface area for a room. The building surface area measurement system generally includes a housing having a triangular shaped base, wherein the housing includes a first side positionable adjacent to a first wall and a second side positionable adjacent to a second wall in a corner, a first measuring unit within the housing directed parallel to the first wall to measure the width of the first wall, a second measuring unit within the housing directed parallel to the second wall to measure the width of the second wall, and an upper measuring unit directed upwardly parallel to the height of the walls. A control unit within the housing is in communication with the measuring units and utilizes the measurement data to calculate the total surface area of the room or the two walls. A display unit within the housing displays the calculated information.

20 Claims, 10 Drawing Sheets

BUILDING SURFACE AREA MEASUREMENT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a laser measurement device and more specifically it relates to a building surface area measurement system for efficiently measuring the surface area for a room.

2. Description of the Related Art

Any discussion of the related art throughout the specification should in no way be considered as an admission that such related art is widely known or forms part of common general knowledge in the field.

Conventional measuring devices are comprised of squares, tape measures and laser tape measures that are only capable of measuring the distance between two locations. While conventional measuring devices are suitable for task they are intended for (i.e. measuring distance), they are not designed to calculate the surface area of a wall or an entire room to help a contractor determine the amount of materials needed to finish the room.

Because of the inherent problems with the related art, there is a need for a new and improved building surface area measurement system for efficiently measuring the surface area for a room.

BRIEF SUMMARY OF THE INVENTION

The invention generally relates to a laser measurement device which includes a housing having a triangular shaped base, wherein the housing includes a first side positionable adjacent to a first wall and a second side positionable adjacent to a second wall in a corner, a first measuring unit within the housing directed parallel to the first wall to measure the width of the first wall, a second measuring unit within the housing directed parallel to the second wall to measure the width of the second wall, and an upper measuring unit directed upwardly parallel to the height of the walls. A control unit within the housing is in communication with the measuring units and utilizes the measurement data to calculate the total surface area of the room or the two walls. A display unit within the housing displays the calculated information.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a communications network, such as the Internet.

A. Overview of Invention

FIGS. 1 through 11 illustrate the present invention. The building surface area measurement system 10 generally includes a housing 20 having a triangular shaped base, wherein the housing 20 includes a first side 24 positionable adjacent to a first wall 12 and a second side 26 positionable adjacent to a second wall 14 in a corner, a first measuring unit within the housing 20 directed parallel to the first wall 12 to measure the width of the first wall 12, a second measuring unit within the housing 20 directed parallel to the second wall 14 to measure the width of the second wall 14, and an upper measuring unit directed upwardly parallel to the height of the walls. A control unit 70 within the housing 20 is in communication with the measuring units and utilizes the measurement data to calculate the total surface area of the room or the two walls. A display unit within the housing 20 displays the calculated information.

Figure 1:
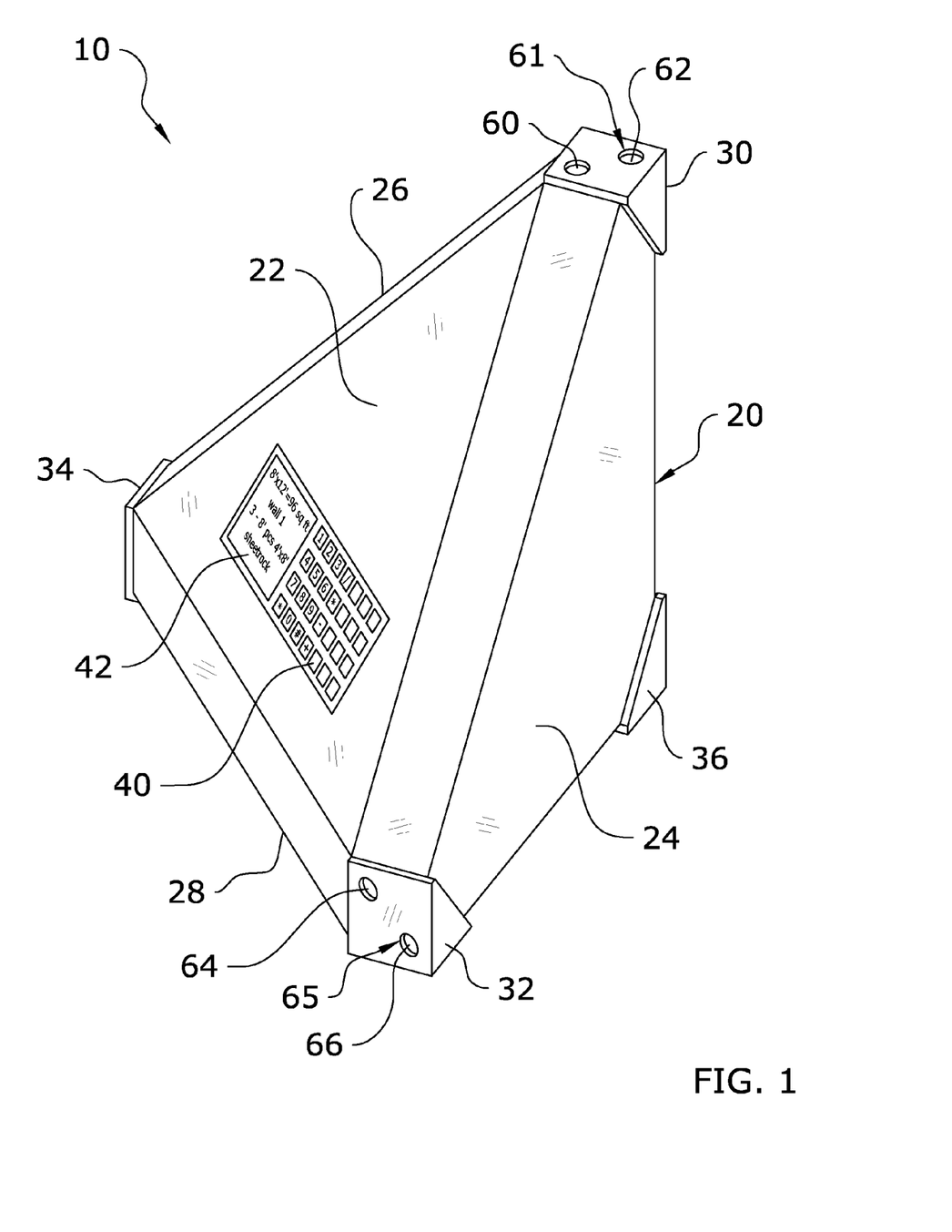
FIG. 1 is an upper perspective view of the present invention.
Figure 2:
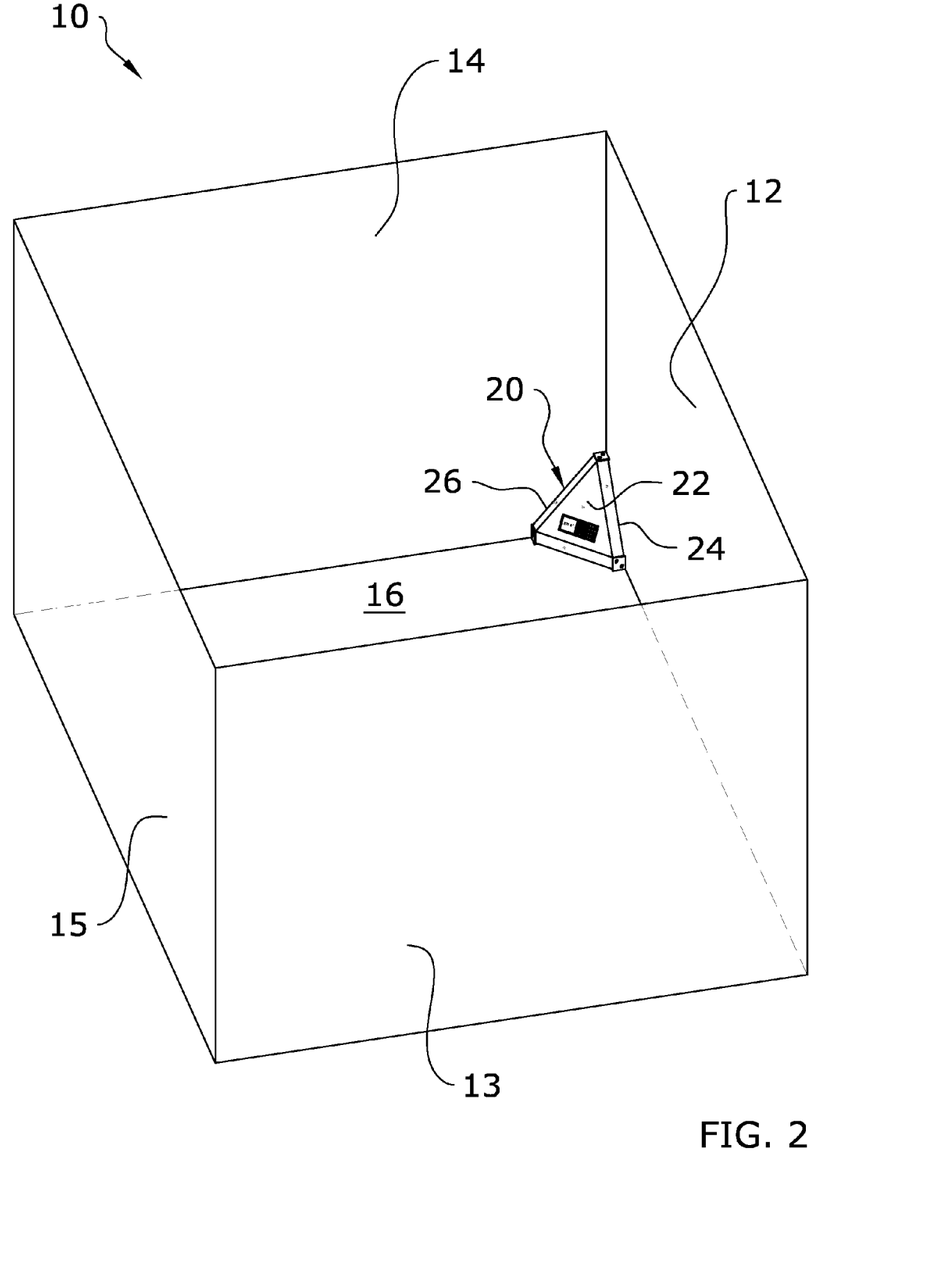
FIG. 2 is an upper perspective view of the present invention positioned within the corner of a room.

FIG. 2 illustrates an exemplary room comprised of four walls with four interior corners, a floor 16 at the lower end of the walls and a ceiling at the upper end of the walls. The room is comprised of a rectangular shape with the opposing walls having a similar shape, size and surface area.

FIG. 2 further illustrates a first wall 12 and a second wall 14 within the room. The first wall 12 is orthogonal with respect to and meets the second wall 14 forming an interior corner within an interior of the room. A first opposing wall 13 is positioned opposite of and parallel to the second wall 14 as illustrated in FIG. 2 of the drawings. The first opposing wall 13 is connected to the first wall 12 in an orthogonal manner. A second opposing wall 15 is positioned opposite of and parallel to the first wall 12 as illustrated in FIG. 2 of the drawings.

B. Housing

Figure 3:
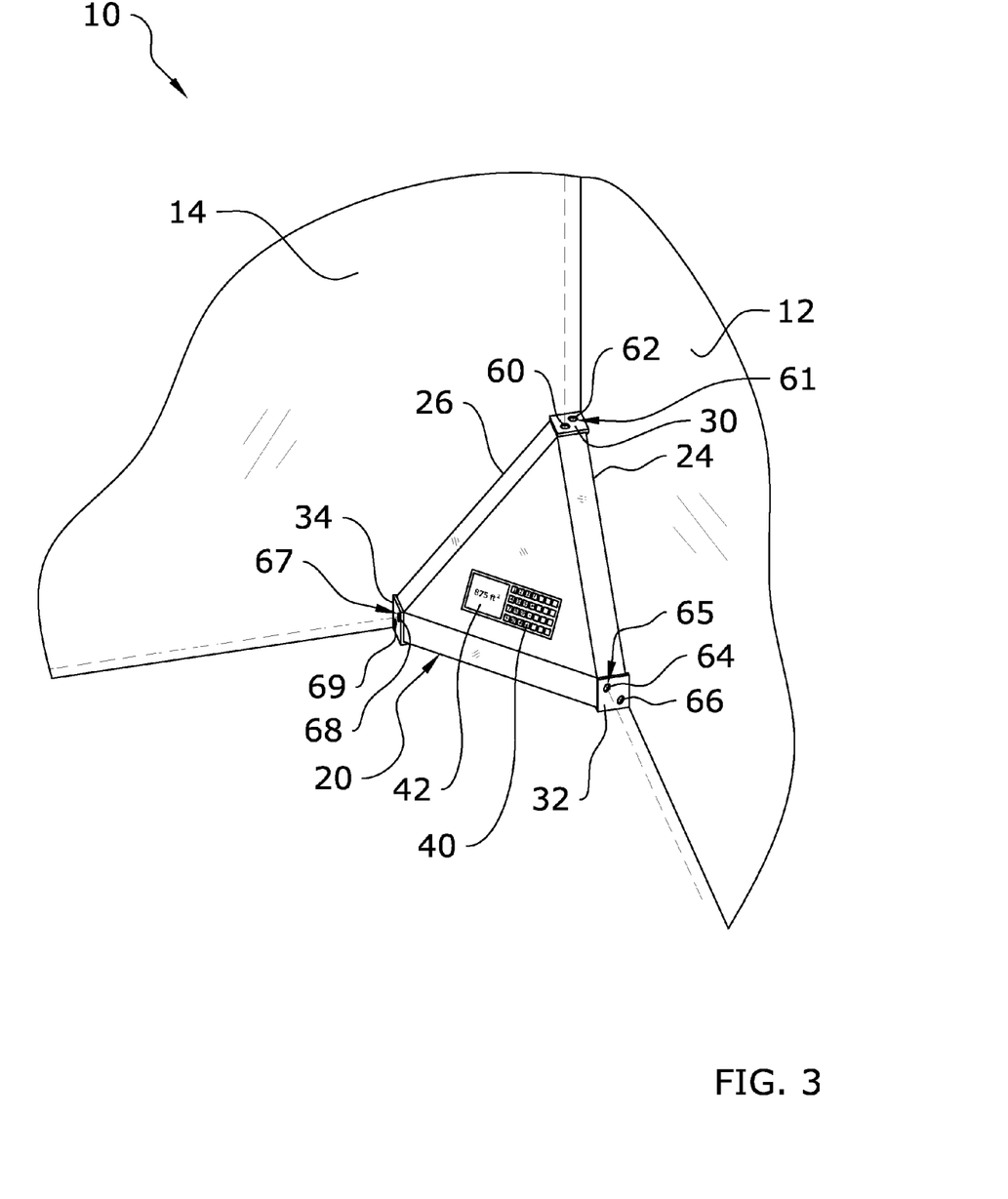
FIG. 3 is a magnified upper perspective view of the present invention positioned within the corner of a room.
Figure 4:
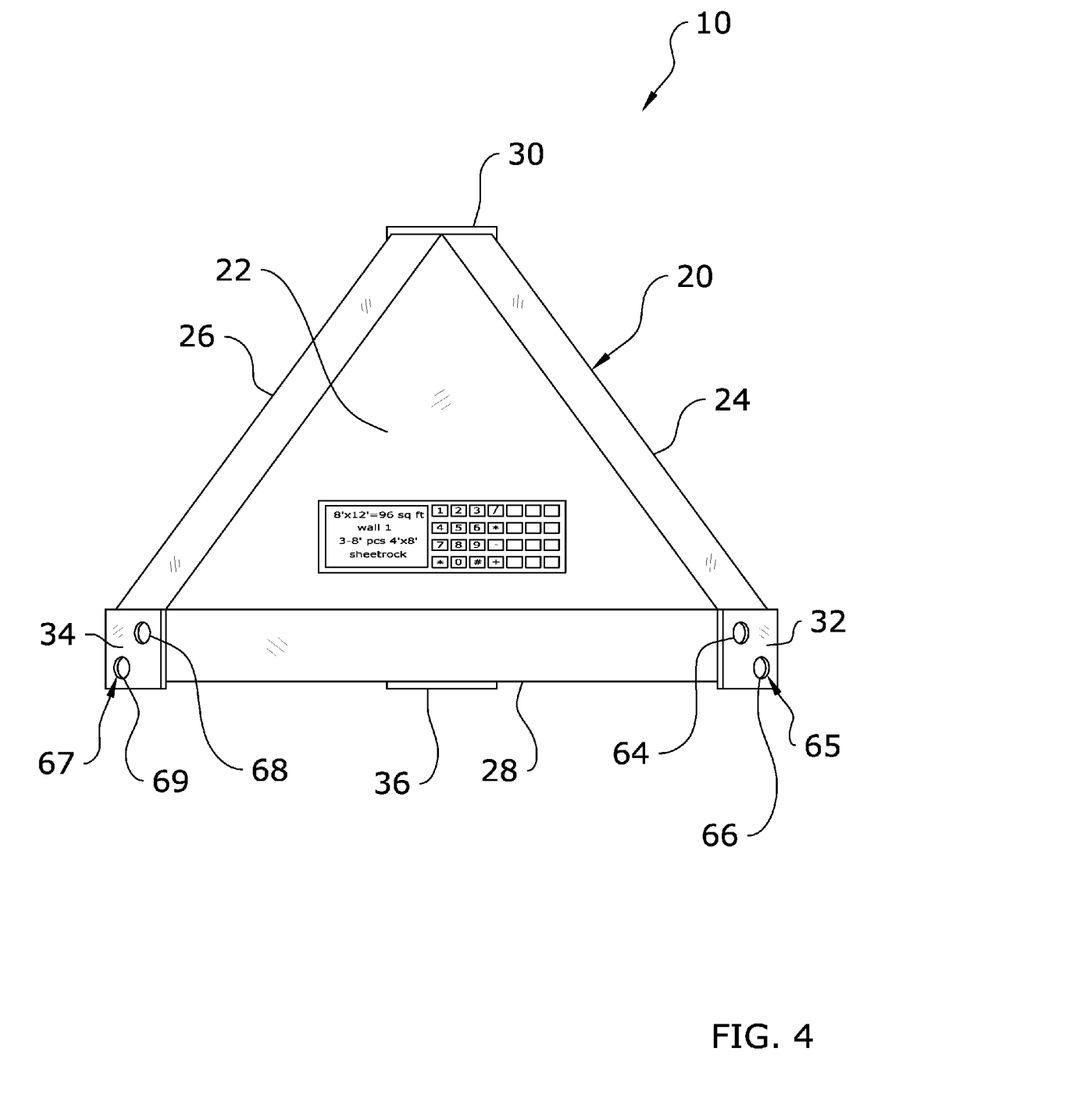
FIG. 4 is a front view of the present invention.
Figure 5:
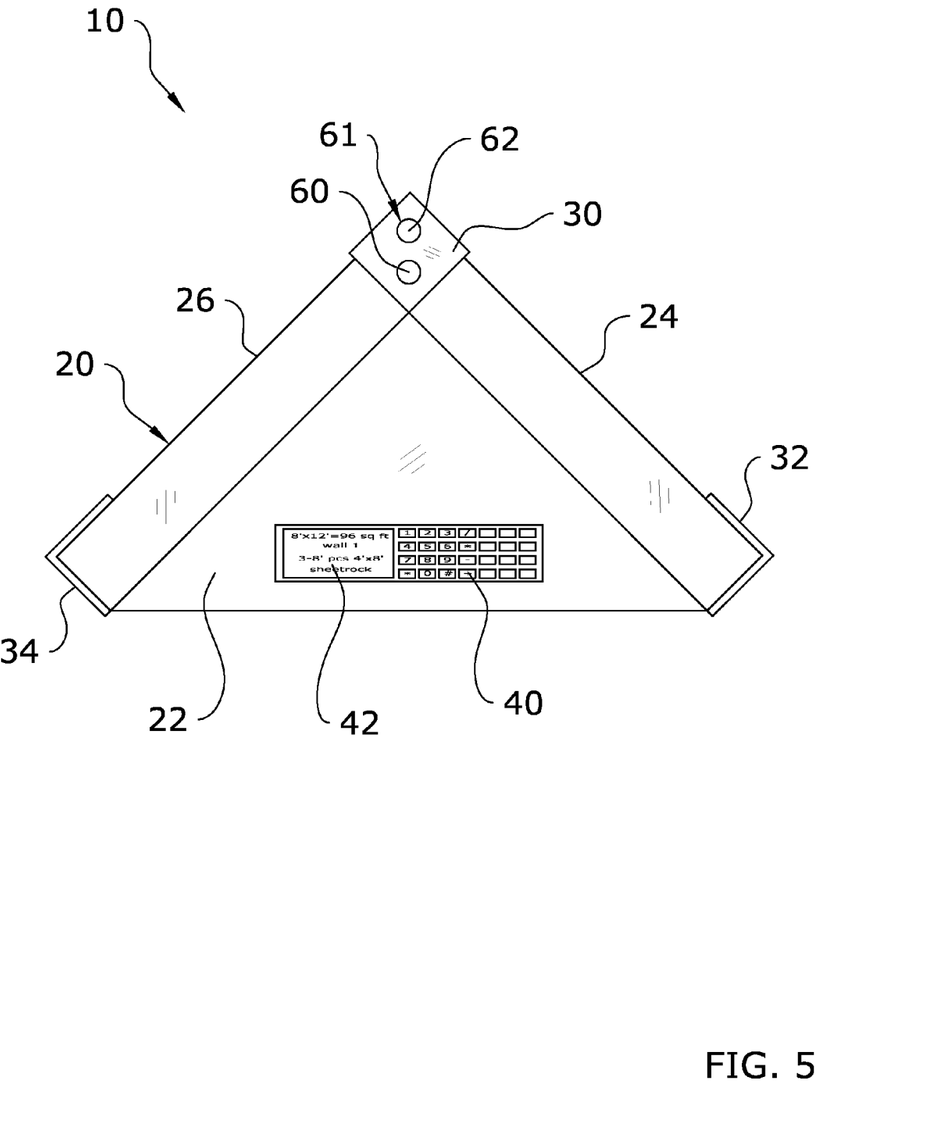
FIG. 5 is a top view of the present invention.
Figure 6:
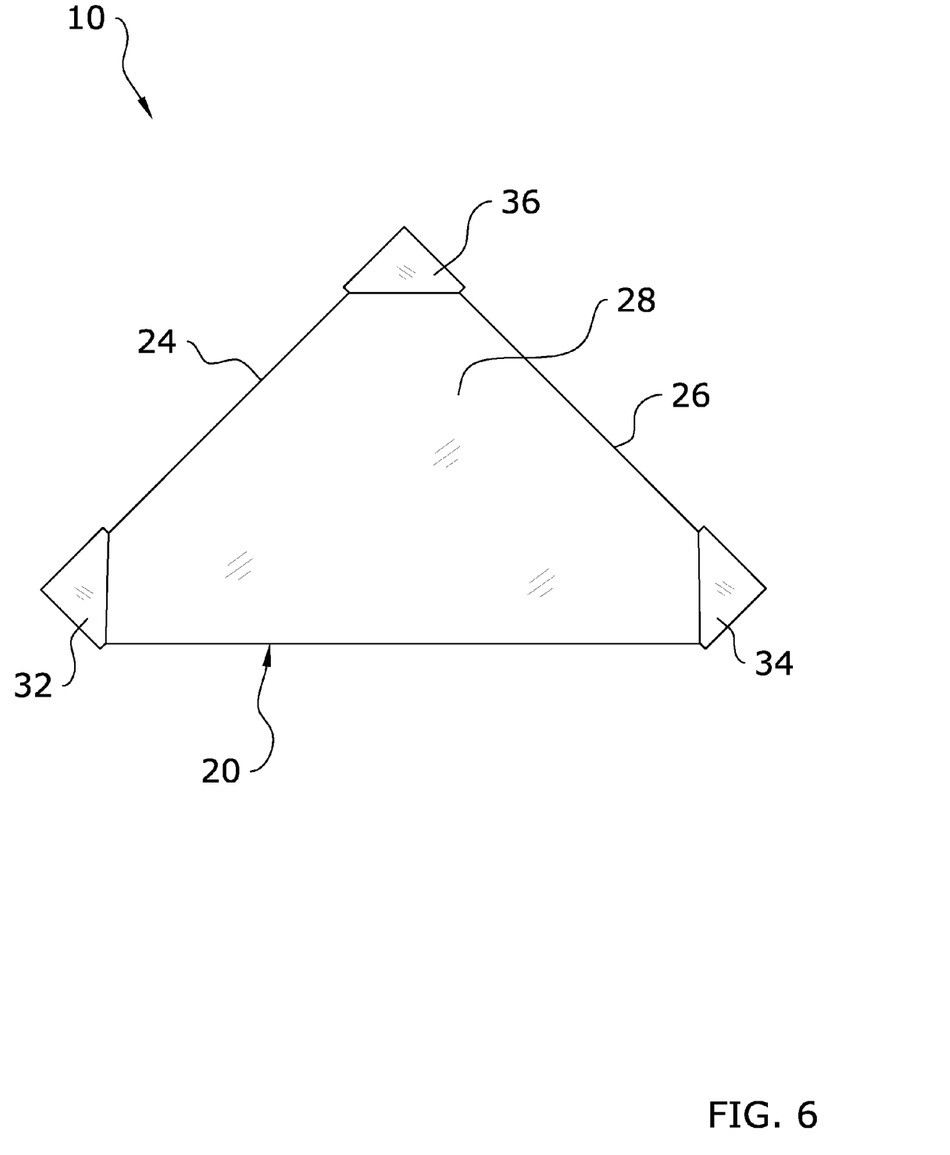
FIG. 6 is a bottom view of the present invention.

FIGS. 1 through 11 illustrate the housing 20 of the present invention. As illustrated in FIGS. 2 and 3 of the drawings, the housing 20 is formed to allow for the housing 20 to be positioned within an interior corner of the room and upon the floor 16 to measure the adjacent walls (e.g. the first wall 12 and the second wall 14). The housing 20 is formed to allow for positioning within an interior corner of a room, and particularly formed to allow for positioning adjacent both a first wall 12 and a second wall 14 as illustrated in FIGS. 2 and 3 of the drawings.

Figure 7:
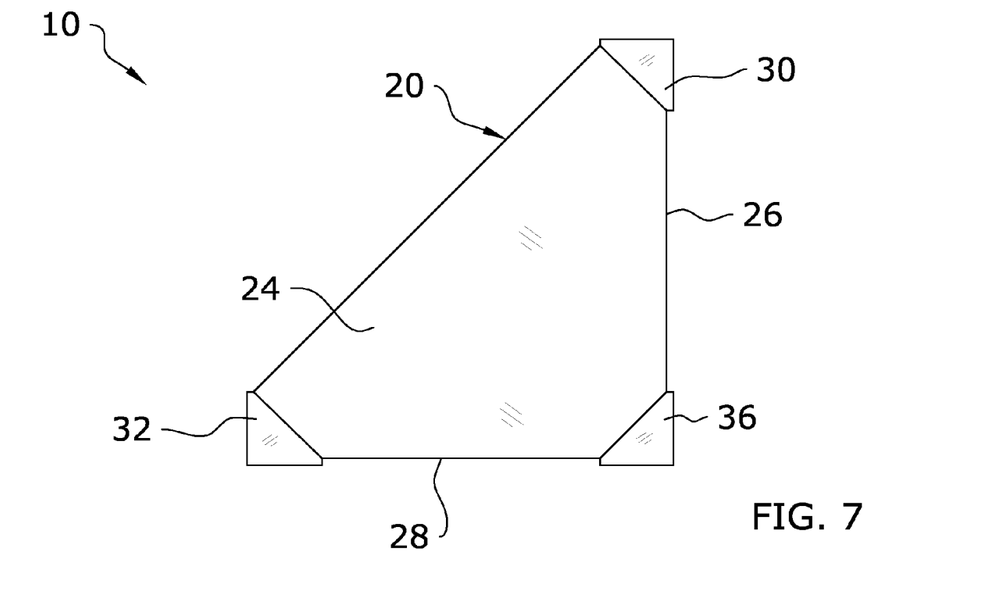
FIG. 7 is a first side view of the present invention.
Figure 8:
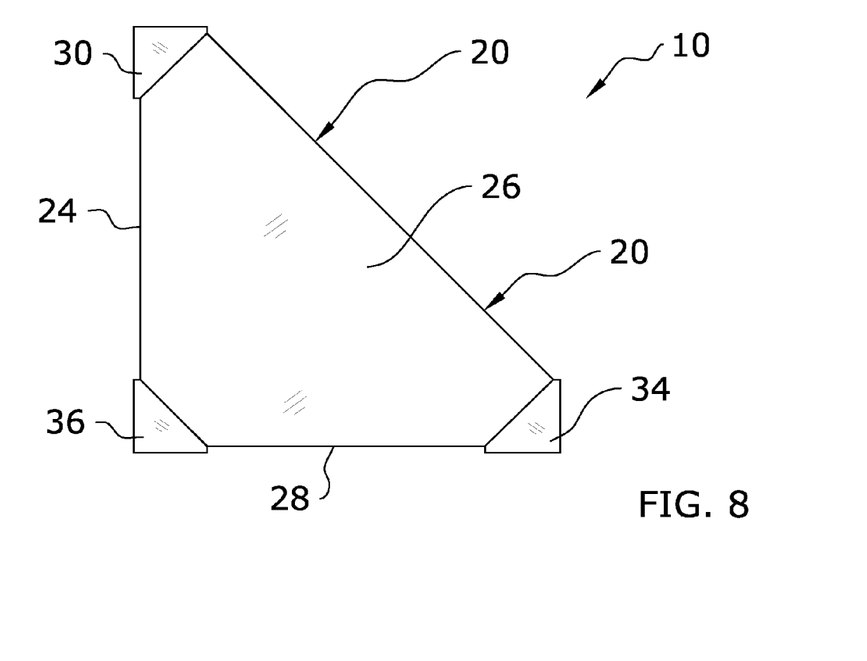
FIG. 8 is a second side view of the present invention.

The housing 20 is preferably comprised of four sides forming a triangular shaped structure. In particular, the housing 20 is preferably comprised of a bottom side 28, a first side 24 positionable adjacent to the first wall 12 and extending upwardly from the bottom side 28, a second side 26 positionable adjacent to the second wall 14 and extending upwardly from the bottom side 28 and a front side 22 extending upwardly from the bottom side 28. The bottom side 28 of the housing 20 is preferably triangular shaped so that the exterior corner of the housing 20 formed by the first side 24 and the second side 26 fits within the interior corner of the room. The first side 24 is orthogonal with respect to the second side 26 of the housing 20. The first side 24 and the second side 26 are preferably triangular shaped as best illustrated in FIGS. 7 and 8 of the drawings. The front side 22 preferably is triangular shaped and slopes upwardly so that the display unit and keypad are facing at an upward angle.

The housing 20 further preferably includes an upper pad 30 at an upper corner, a first pad 32 at a first corner, a second pad 34 at a second corner and a third pad 36 at a third corner of the housing 20. The pads 30, 32, 34, 36 are preferably comprised of a resilient material to protect the housing 20 and to protect the interior of the room.

C. Measuring Units

The present invention includes three measuring units 61, 65, 67 to measure the width of the first wall 12, the width of the second wall 14 and the height of the walls 12, 14. A first measuring unit 65 is positioned within the housing 20 and is adapted to be directed parallel to the first wall 12 of a room to measure a first width of the first wall 12. A second measuring unit 67 is positioned within the housing 20 and is adapted to be directed parallel to the second wall 14 of the room to measure a second width of the second wall 14. An upper measuring unit 61 is positioned within the housing 20 and is adapted to be directed upwardly parallel to the first wall 12 and the second wall 14 of the room to measure a height of the walls.

The first measuring unit 65 is preferably comprised of a first transmitter 64 that transmits a first signal and a first receiver 66 that receives a first reflected signal that is reflected from the first opposing wall 13. The second measuring unit 67 is preferably comprised of a second transmitter 68 that transmits a second signal and a second receiver 69 that receives a second reflected signal that is reflected from the second opposing wall 15. The upper measuring unit 61 is preferably comprised of an upper transmitter 60 that transmits an upper signal and an upper receiver 62 that receives an upper reflected signal reflected by the ceiling of the room. The first measuring unit 65, the second measuring unit 67 and the upper measuring unit 61 are preferably comprised of laser measuring devices that utilize a laser to calculate a distance. The measurement of distance utilizing laser tape measures is well-known in the art and similar technologies may be utilized within the present invention for measuring the width and height of the walls.

D. Control Unit

Figure 9A:
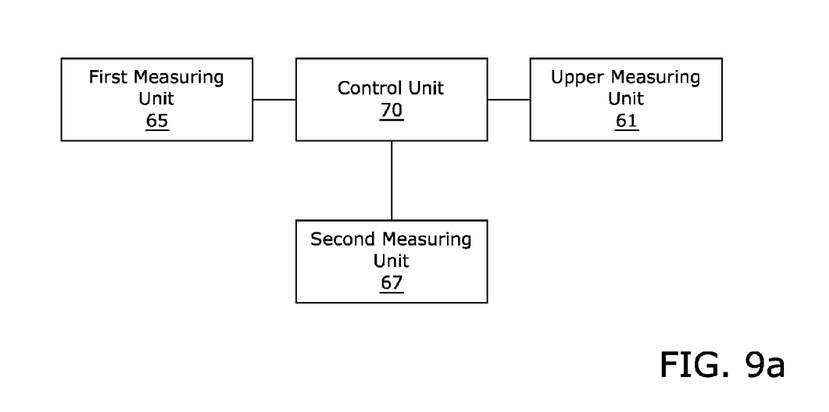
FIG. 9a is a block diagram illustrating the communications between the measuring units and the control unit.
Figure 9B:
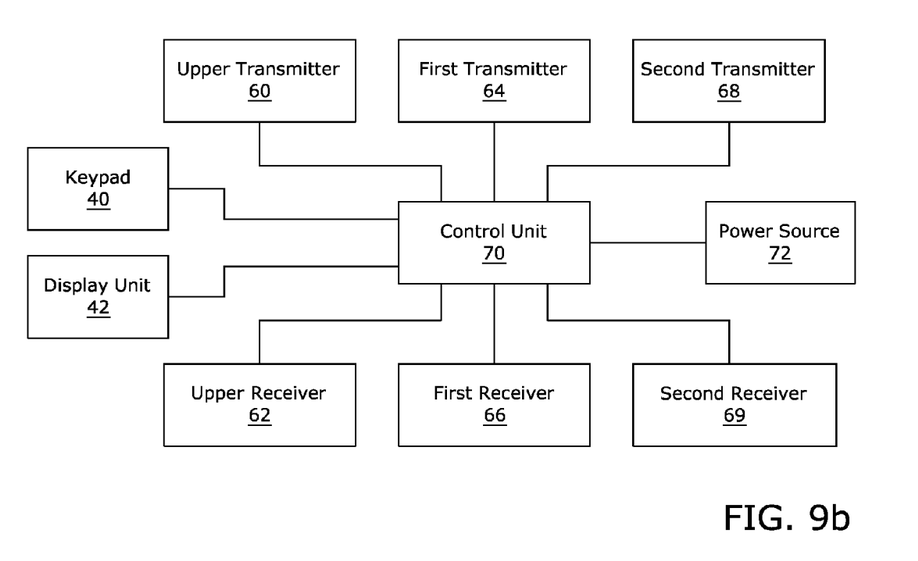
FIG. 9b is a block diagram illustrating the electronic components of the present invention.

The control unit 70 is in communication with the first measuring unit 65, the second measuring unit 67 and the upper measuring unit 61 as illustrated in FIG. 9 of the drawings. The control unit 70 is programmed to calculate a total surface area of the first wall 12 and the second wall 14 utilizing measurement data from the measuring units. The control unit 70 is preferably programmed to calculate a total room surface area representing the entire surface rear of the walls within the room. Various other items may be calculated by the control unit 70. A power source 72 (e.g. battery) is electrically connected to the control unit 70 to provide electrical power to the control unit 70 and the measuring units. The control unit 70 is also preferably capable of calculating the total number of sheets of sheetrock required based on the size of the sheetrock and the total surface area calculated. The control unit 70 may also calculate the total gallons of paint required to paint the walls and/or ceiling of the room.

E. Display Unit

A display unit is positioned within the housing 20 and is in communication with the control unit 70 to display various types of information including the surface area of the first wall 12 and the second wall 14, or the total surface area of all the walls in the room. The display unit may also display various other types of information including individual measurements for each wall (e.g. width, height). The display unit may be comprised of any type of display capable of displaying visual information (e.g. LCD screen, LED screen, etc.).

F. Keypad

A keypad is positioned within the housing 20 and is in communication with the control unit 70 as illustrated in FIGS. 1 through 5 and 9 of the drawings. The keypad allows for the manual entry of data and selecting the type of measurement to be performed (e.g. total surface area of the walls, total surface area of the ceiling, total surface area of the floor 16, total surface area of the first wall 12 and the second wall 14, etc.).

The keypad can also be utilized to enter the material type to be calculated (e.g. sheetrock, paint) that will be needed to finish the room utilizing standard assumptions (e.g. the amount of paint required per square foot, the standard size of sheetrock).

G. Support Base

Figure 10:
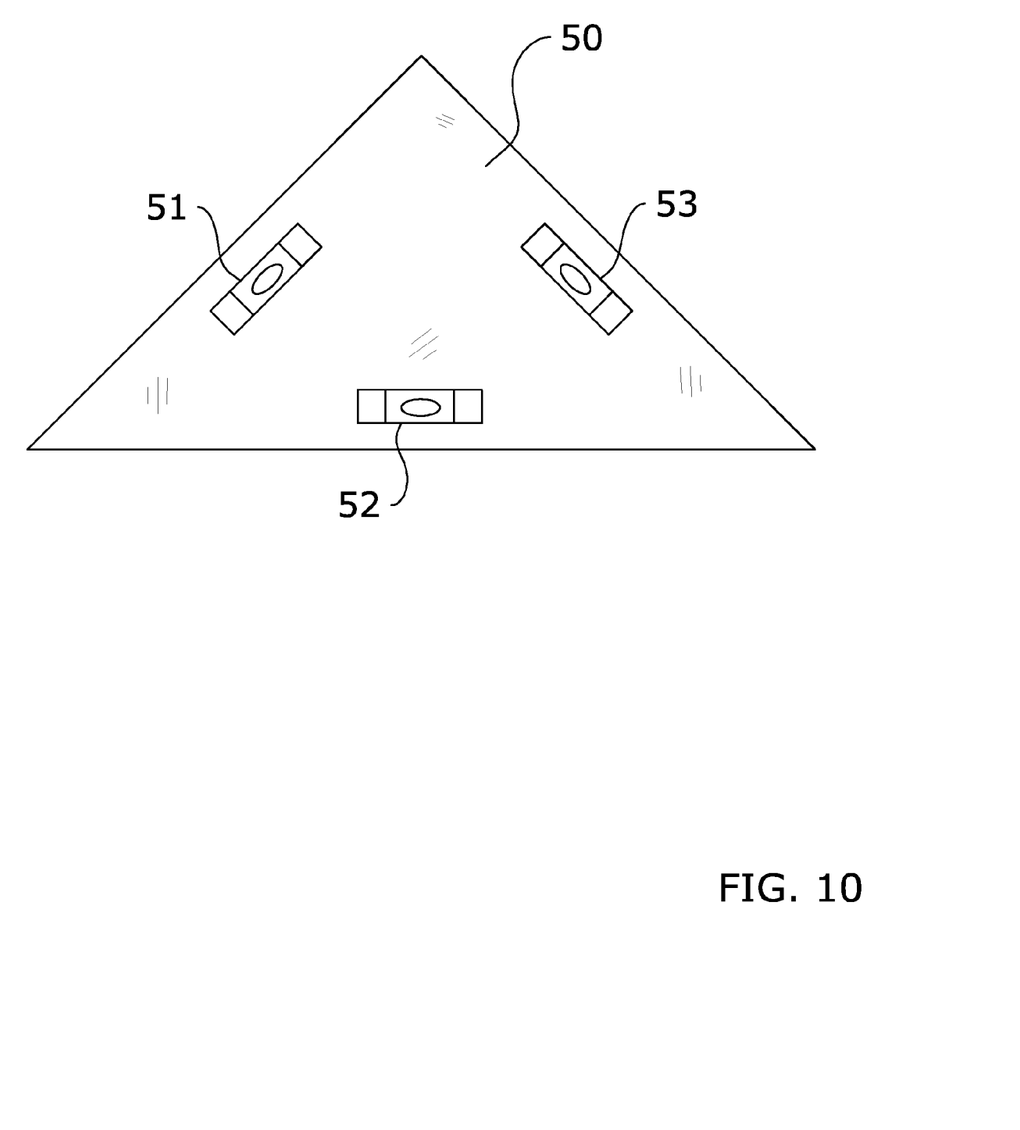
FIG. 10 is a top view of a support base for providing a level support platform for the housing.
Figure 11:
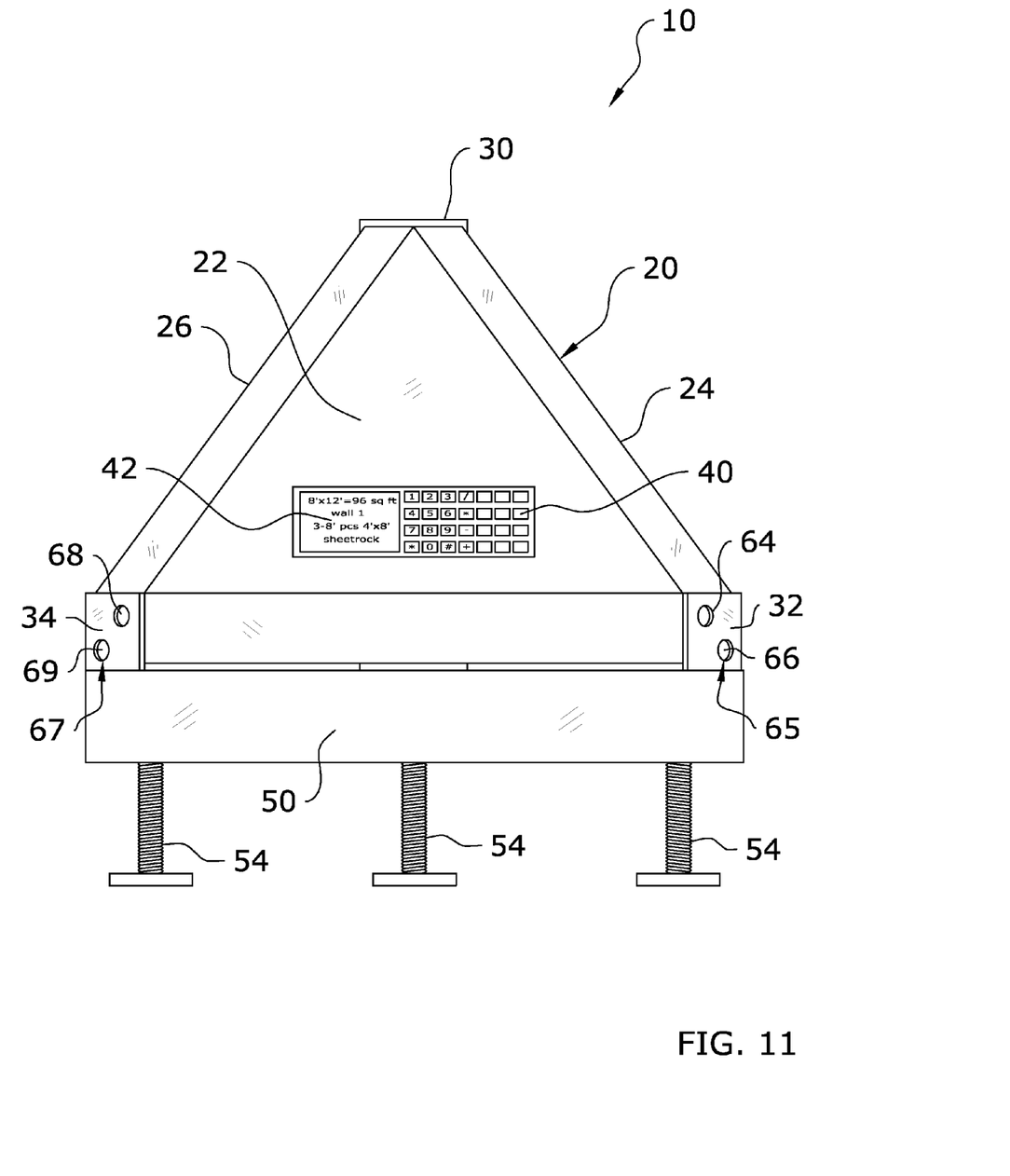
FIG. 11 is a front view of the support base supporting the housing in a level manner.

In an alternative embodiment shown in FIGS. 10 and 11 of the drawings, a support base 50 is provided that allows for providing a level surface for the housing 20 to ensure accurate measurements of the walls. The support base 50 preferably has a triangular shape as illustrated in FIG. 10 that includes a first level 51 along a first portion, a second level 52 along a second portion, and a third level 53 along a third portion to visually indicate the levelness of the upper surface of the support base 50. A plurality of adjustable legs 54 are attached to the bottom of the support base 50 that allow for manual leveling of the support base 50. The housing 20 is positioned upon the upper surface of the support base 50 after the support base 50 is level as illustrated in FIG. 11 of the drawings.

H. Operation of Preferred Embodiment

In use, the user positions the housing 20 within an interior corner of a room to be measured. The user selects a power button on the keypad which activates the present invention. The user then selects the type of measurement they desire (e.g. total surface area of the walls in the room). Once the measurement is selected, the first measuring unit 65 measures the width of the first wall 12, the second measuring unit 67 measures the width of the second wall 14 and the upper measuring unit 61 measures the height of the walls 12, 14. The control unit 70 receives the measurement data from the measuring units 61, 65, 67 and calculates the desired measurement such as the total surface area of the walls in the room. The control unit 70 adjusts for the distance the measuring units 61, 65, 67 are positioned away from the apex of the interior corner of the room (e.g. if the first side 24 of the housing 20 has a width of 6 inches, the control unit 70 adds 6 inches to the measured distance of the first wall 12 to compensate for the first measuring unit 65 being positioned 6 inches away from the second wall 14. The measurement is displayed on the display unit. If the user selected that they wanted the number of sheets of sheetrock, the control unit 70 calculates the total number of sheets required based on the standard size of 4'×8'. The user may record and store the calculated data within the control unit 70 for later usage when ordering materials.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A building surface area measurement system, comprising:
   a housing;
   a first measuring unit within said housing adapted to be directed parallel to a first wall of a room to measure a first width of said first wall,
   a second measuring unit within said housing adapted to be directed parallel to a second wall of said room to measure a second width of said second wall;
   an upper measuring unit adapted to be directed upwardly parallel to said first wall and said second wall of said room to measure a height of said walls; and
   a control unit in communication with said first measuring unit, said second measuring unit and said upper measuring unit, wherein said control unit is programmed to calculate a total surface area of said first wall and said second wall utilizing measurement data from said measuring units.

2. The building surface area measurement system of claim 1, wherein said housing is comprised of a bottom side, a first side positionable adjacent to a first wall and extending upwardly from said bottom side, a second side positionable adjacent to a second wall and extending upwardly from said bottom side and a front side extending upwardly from said bottom side.

3. The building surface area measurement system of claim 2, wherein said bottom side is triangular shaped.

4. The building surface area measurement system of claim 3, wherein said first side and said second side are triangular shaped.

5. The building surface area measurement system of claim 4, wherein said first side and said second side are orthogonal with respect to one another.

6. The building surface area measurement system of claim 4, wherein said first side and said second side are orthogonal with respect to one another.

7. The building surface area measurement system of claim 2, wherein said first wall and said second wall meet to form an interior corner of a room.

8. The building surface area measurement system of claim 1, including a display unit within said housing, wherein said display unit displays said total surface area.

9. The building surface area measurement system of claim 1, wherein said control unit is programmed to calculate a total room surface area.

10. The building surface area measurement system of claim 1, wherein said first measuring unit, said second measuring unit and said upper measuring unit are comprised of laser measuring devices.

11. The building surface area measurement system of claim 1, wherein said first measuring unit is comprised of a first transmitter that transmits a first signal and a first receiver that receives a first reflected signal, wherein said second measuring unit is comprised of a second transmitter that transmits a second signal and a second receiver that receives a second reflected signal, and wherein said upper measuring unit is comprised of an upper transmitter that transmits an upper signal and an upper receiver that receives an upper reflected signal.

12. A building surface area measurement system, comprising:
   a room comprised of a floor, a first wall, a second wall and a ceiling, wherein said first wall is orthogonal with respect to said second wall, wherein said first wall meets said second wall forming an interior corner within an interior of said room;

a housing positioned within said interior corner of said room and upon said floor;

a first measuring unit within said housing adapted to be directed parallel to said first wall of a room to measure a first width of said first wall, a second measuring unit within said housing adapted to be directed parallel to said second wall of said room to measure a second width of said second wall;

an upper measuring unit adapted to be directed upwardly parallel to said first wall and said second wall of said room to measure a height of said walls; and a control unit in communication with said first measuring unit, said second measuring unit and said upper measuring unit, wherein said control unit is programmed to calculate a total surface area of said first wall and said second wall utilizing measurement data from said measuring units.

13. The building surface area measurement system of claim 12, wherein said housing is comprised of a bottom side, a first side positionable adjacent to a first wall and extending upwardly from said bottom side, a second side positionable adjacent to a second wall and extending upwardly from said bottom side and a front side extending upwardly from said bottom side.

14. The building surface area measurement system of claim 13, wherein said bottom side is triangular shaped.

15. The building surface area measurement system of claim 14, wherein said first side and said second side are triangular shaped.

16. The building surface area measurement system of claim 12, including a display unit within said housing, wherein said display unit displays said total surface area.

17. The building surface area measurement system of claim 12, wherein said control unit is programmed to calculate a total room surface area.

18. The building surface area measurement system of claim 12, wherein said first measuring unit, said second measuring unit and said upper measuring unit are comprised of laser measuring devices.

19. A building surface area measurement system, comprising:

a room comprised of a floor, a first wall, a second wall and a ceiling, wherein said first wall is orthogonal with respect to said second wall, wherein said first wall meets said second wall forming an interior corner within an interior of said room;

a housing positioned within said interior corner of said room and upon said floor;

wherein said housing is comprised of a bottom side, a first side positionable adjacent to a first wall and extending upwardly from said bottom side, a second side positionable adjacent to a second wall and extending upwardly from said bottom side and a front side extending upwardly from said bottom side;

wherein said bottom side is triangular shaped;

wherein said first side and said second side are orthogonal with respect to one another;

a first measuring unit within said housing adapted to be directed parallel to said first wall of a room to measure a first width of said first wall, a second measuring unit within said housing adapted to be directed parallel to said second wall of said room to measure a second width of said second wall;

an upper measuring unit adapted to be directed upwardly parallel to said first wall and said second wall of said room to measure a height of said walls; and a control unit in communication with said first measuring unit, said second measuring unit and said upper measuring unit, wherein said control unit is programmed to calculate a total surface area of said first wall and said second wall utilizing measurement data from said measuring units; and a display unit within said housing and in communication with said control unit, wherein said display unit displays said total surface area.

20. The building surface area measurement system of claim 19, wherein said control unit is programmed to calculate a total room surface area.

* * * * *